United States Patent [19]

Ueno

[11] Patent Number: 5,581,676
[45] Date of Patent: Dec. 3, 1996

[54] DRAWING PROCESSOR AND MACHINING PROGRAM PROCESSOR FOR GENERATING A MACHINING PROGRAM AND METHOD THEREFOR

[75] Inventor: Masayuki Ueno, Aichi, Japan

[73] Assignee: Mitsubishi Denki Kabushiki Kaisha, Tokyo, Japan

[21] Appl. No.: 15,377

[22] Filed: Feb. 9, 1993

[30] Foreign Application Priority Data

Feb. 17, 1992 [JP] Japan ................................ 4-029710
Sep. 3, 1992 [JP] Japan ................................ 4-235716

[51] Int. Cl.$^6$ .............................................. G06T 17/00
[52] U.S. Cl. ................................... 395/140; 395/326
[58] Field of Search ................................. 395/140, 120, 395/133, 141, 145–147, 155–161, 919–921, 600; 364/DIG. 1, 474.22–474.24

[56] References Cited

U.S. PATENT DOCUMENTS 5,070,534  12/1991  Lascelles et al. .................. 395/141
5,089,950   2/1992  Miyata et al. ............... 364/DIG. 1 X
5,197,120   3/1993  Saxton et al. ....................... 395/141

FOREIGN PATENT DOCUMENTS 0348522  1/1990  European Pat. Off. .
3105473  5/1991  Japan .
3175504  7/1991  Japan .

Primary Examiner—Almis R. Jankus
Attorney, Agent, or Firm—Sughrue, Mion, Zinn, Macpeak & Seas

[57] ABSTRACT

A machining program processor and a machining program processing method which includes a drawing processor that allows a plurality of modified shapes to be generated easily from one parametric diagram without the need for an input of graphic data for every machining shape. A nominal dimension list, having data input areas for nominal dimension names is generated with reference to a parametric diagram and is stored.

25 Claims, 19 Drawing Sheets

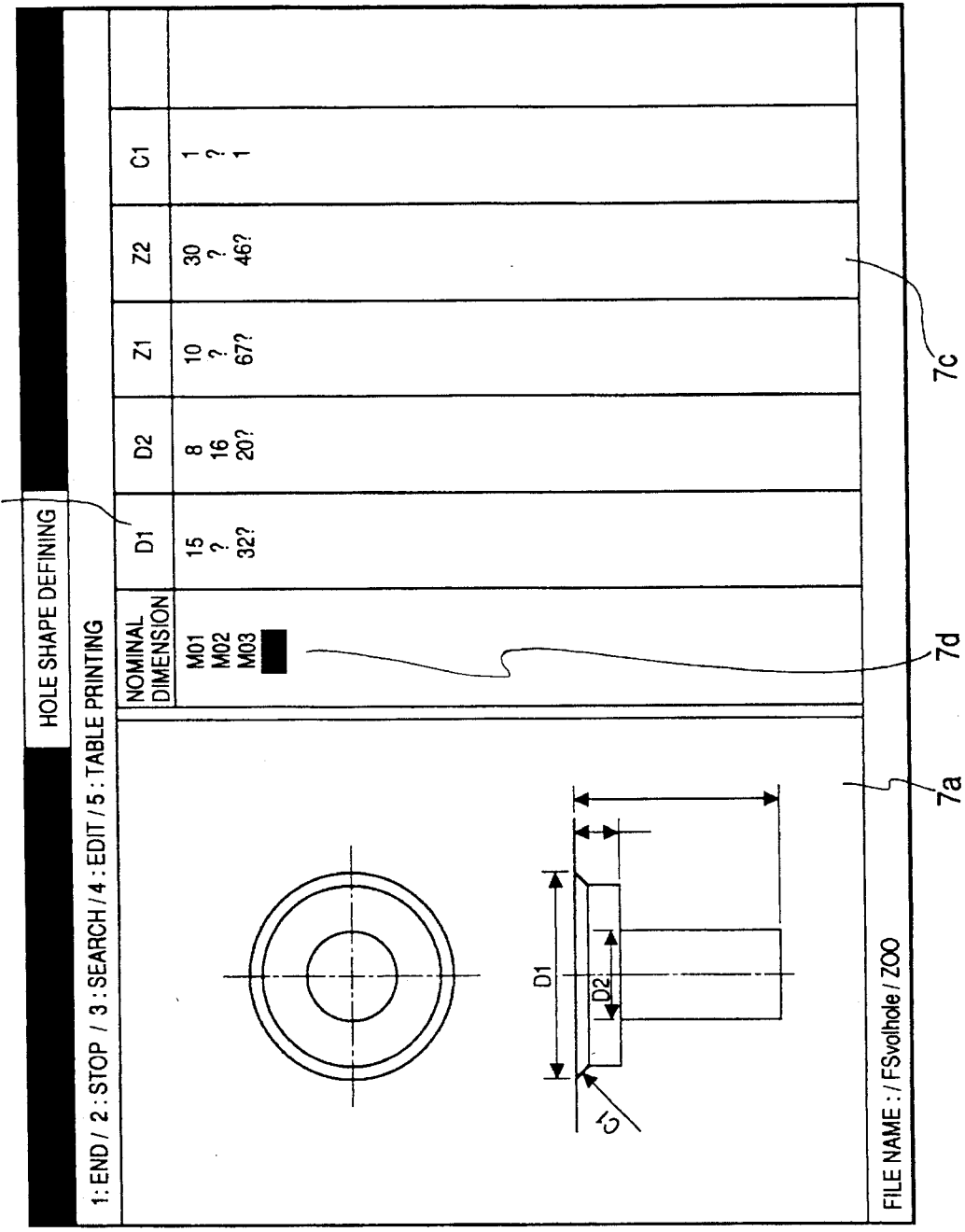

FIG. 21

HOLE MACHINING

1: END / 2: STOP / 3: READ / 4: REGISTER / 5: EDIT / 6: PRINT

| HOLE MACHINING TYPE | CENTER 1 | DRILL 2 | SPOT FACE 3 | CHAMFER 5 | | | |
|---|---|---|---|---|---|---|---|
| PROCESS DIVISION (0-4) | | | | | | | |
| TOOL NAME | CSW10020 | DSV03420 | ZGV06520 | CMV15020 | | | |
| SPINDLE SPEED | 500 | 1000 | 800 | 800 | | | |
| MACHINED SURFACE | | | | | | | |
| SAFETY ALLOWANCE | | | | | | | |

SUBJECT NAME TO BE MACHINED : M01

DRAWING PROCESSOR AND MACHINING PROGRAM PROCESSOR FOR GENERATING A MACHINING PROGRAM AND METHOD THEREFOR

BACKGROUND OF THE INVENTION

1. Field of the Invention

The present invention relates to a drawing processor which allows a machining shape to be plotted efficiently by the registration and quotation of dimensional information corresponding to machining shape information, and to a machining program processor and a machining program processing method which allow a machining program to be written efficiently using a drawing processor.

2. Description of the Background Art

FIG. 26 is an arrangement diagram illustrating a CAD/CAM apparatus known in the art, wherein the numeral 1 indicates a keyboard, 2 denotes a mouse, and 3 represents a tablet, each of which is an input device for inputting graphic data and character data. 4 designates a shape generator for converting graphic data into an internal storage format, 13 indicates internal memory for storing graphic data, 14 shows a parts library for storing a shape as a part or reading it into the internal memory 13, and 19 designates a shape analyzer. 20 denotes an NC data generator, 21 represents an NC program generated by the NC data generator 20, 22 shows a machining path display, and 23 indicates a CRT.

The operation of the CAD/CAM apparatus will now be described with reference to FIG. 26. First, graphic data is input from the input devices, such as the keyboard 1, mouse 2, and/or tablet 3. The shape generator 4 converts the graphic data into information in accordance with the internal storage format. This information is stored temporarily in the internal memory 13 for processing. When the information stored in the internal memory 13 is to be retained for long period, the information is converted into a file format as a shape part and is stored in the parts library 14. The shape part stored in the parts library 14 is may be transferred back to the internal memory 13, for example, when an NC program is to be generated. On the basis of the information stored in the internal memory 13, the shape analyzer 19 can create information that defines a machining path and is useable in the generation of an NC program. The NC data generator 20 is operative to add other NC information to the machining path information and to output an NC program 21. The machining path display 22 can convert the machining path information into graphic information and display the graphic information on the CRT 23.

In the known CAD/CAM apparatus which is arranged as described above, an operator can plot the graphics in two ways. First, the operator can plot the graphics, and thereby create graphic data, by using the input devices, such as the keyboard 1, mouse 2 and/or tablet 3. Second, the operator can plot the graphics, and thereby retrieve the graphics data, by calling desired graphics shapes that have been pre-registered in the parts library 14. When the parts library 14 storing fixed data is employed, each of the graphics (e.g., representing standard parts) must all be registered into the parts library 14, even if identical in shape but different in some or all dimensions. For this purpose, a large-capacity storage device is required for the parts library 14.

In addition, machining conditions for the generation of the NC program used to machine the selected shapes must be added and associated with each selected shape.

Another conventional apparatus replaces graphics registered into the parts library 14 by parametric diagrams, as disclosed in Japanese Patent Disclosure Publication No. 175504 of 1991. The apparatus concerned is operated as indicated by the flow chart in FIG. 27 to create an NC program from a parametric diagram registered in the parts library 14.

Namely, the operator quotes a parametric diagram registered in the parts library 14 (step 201) and inputs all specific dimensional values to the changeable dimensions in the quoted parametric diagram (step 202). The operator then indicates the shape to be machined (step 203) and sets machining conditions one by one for the shape indicated (step 204). Finally, an NC program is generated (step 205).

As is clear from FIG. 27, this conventional apparatus does not require all shapes to be registered into the parts library 14. However, it does require shape data to be input every time a graphic shape is to be defined and also requires machining conditions to be set for each defined shape, as in the background art shown in FIG. 26.

As described above, the background art requires the performance of a great many processes, in proportion to the number of shapes used, for the activity beginning with shape plotting to the output of an NC program that may be used for machining.

SUMMARY OF THE INVENTION

It is, accordingly, an object of the present invention to overcome the disadvantages in the conventional apparatuses by providing an operator-friendly drawing processor which reduces the number of processes required for shape plotting.

It is another object of the present invention to provide a machining program processor and a machining program processing method which provides the steps required for the stages ranging from shape plotting to NC program output.

The invention uses a nominal dimension list which allows a plurality of modified shapes to be generated easily from one parametric diagram at the same time and does not require graphic data to be input for every machining shape, whereby machining shapes are plotted easily and plotting time is reduced.

The present invention further allows data to be input to a nominal dimension list with reference to a parametric diagram and also permits interactive input, whereby data input is facilitated and data input errors are reduced.

The present invention does not require numerical value data to be input to the data input areas of a nominal dimension list from numeral keys initially, further facilitating data input.

The present invention allows the number of processes ranging from the plotting of a machining shape to the output of an NC program to be reduced by the operation of machining condition adding means.

BRIEF DESCRIPTION OF THE DRAWINGS

FIG. 9 shows the nominal dimension list displayed on the CRT to illustrate the result of the processing operation of the interactive inputting means.

FIG. 21 shows a machining condition list concerned with the first embodiment of the present invention.

DESCRIPTION OF THE PREFERRED EMBODIMENTS

Figure 1:
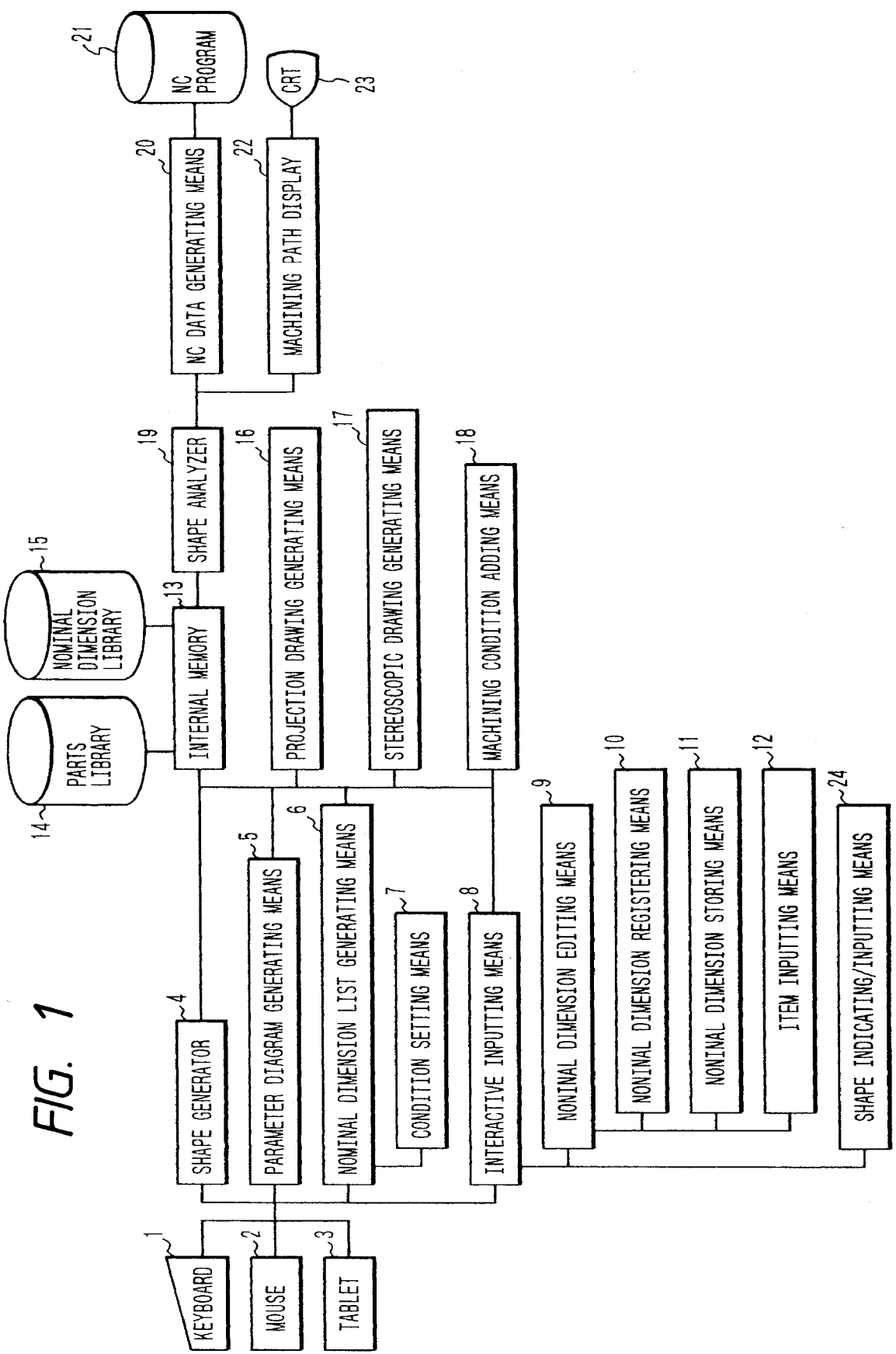
FIG. 1 is an arrangement diagram illustrating a CAD/CAM apparatus concerned with a first embodiment of the present invention.
Figure 4:
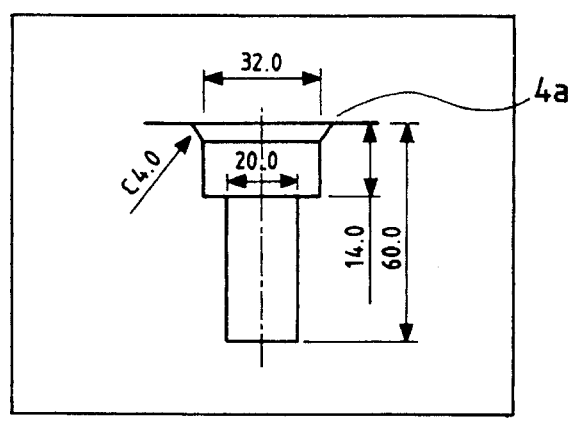
FIG. 4 shows a drawing displayed on the CRT to illustrate the result of the processing operation of the parametric diagram generating means.
Figure 5:
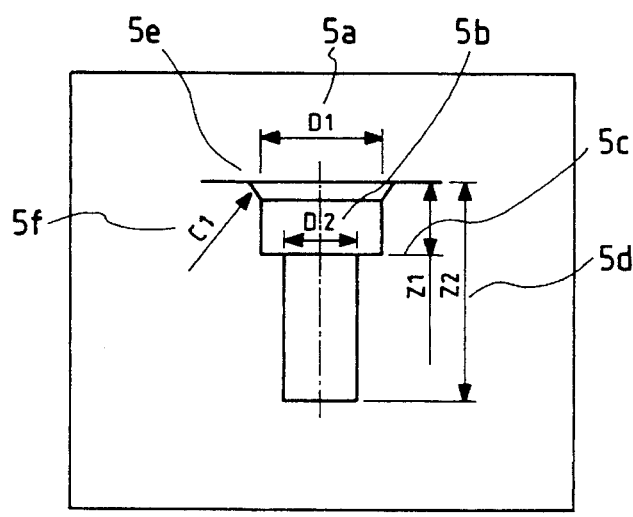
FIG. 5 shows a drawing displayed on the CRT to illustrate the result of the processing operation of the parametric diagram generating means.

An embodiment of the present invention will now be described with reference to FIGS. 1 to 22 by giving a CAD/CAM apparatus as an example. FIG. 1 shows the arrangement of a CAD/CAM apparatus which employs the present invention, wherein the numerals 1 to 4 indicate parts identical to those in the conventional apparatus. 5 indicates parametric diagram generating means for generating a "parametric diagram" as shown in FIG. 5 from a shape diagram, 6 shows nominal dimension list generating means for generating a "nominal dimension list" as shown in FIG. 7 from a parametric diagram, 7 represents condition setting means for setting predetermined conditions (details will be described later) for the items of the nominal dimension list generated by the nominal dimension list generating means 6, 8 denotes interactive inputting means for inputting values for the items of the nominal dimension list, 9 designates nominal dimension list editing means for exercising control of the editing function of the interactive inputting means 8, 10 identifies a nominal dimension registering means for providing a registering function for the nominal dimension list editing means 9, 11 indicates a nominal dimension storing means for providing a storage function for the nominal dimension list editing means 9, and 12 denotes an item inputting means for providing an input function for the nominal dimension list editing means 9.

13 indicates internal memory for storing various data, 14 indicates a parts library, 15 denotes a nominal dimension library for storing "nominal dimension information", 16 represents projection drawing generating means for generating a projection drawing from the nominal dimension information, 17 denotes stereoscopic drawing generating means for generating a stereoscopic drawing from the nominal dimension information, 18 indicates machining condition adding means for adding "machining conditions" to the projection diagram and stereoscopic diagram generated from the nominal dimension information, 19 designates a shape analyzer, 20 denotes an NC data generator, 21 represents an NC program generated, 22 shows a machining path display, 23 indicates a CRT acting as a display device, and 24 designates shape indicating/inputting means.

Figure 2:
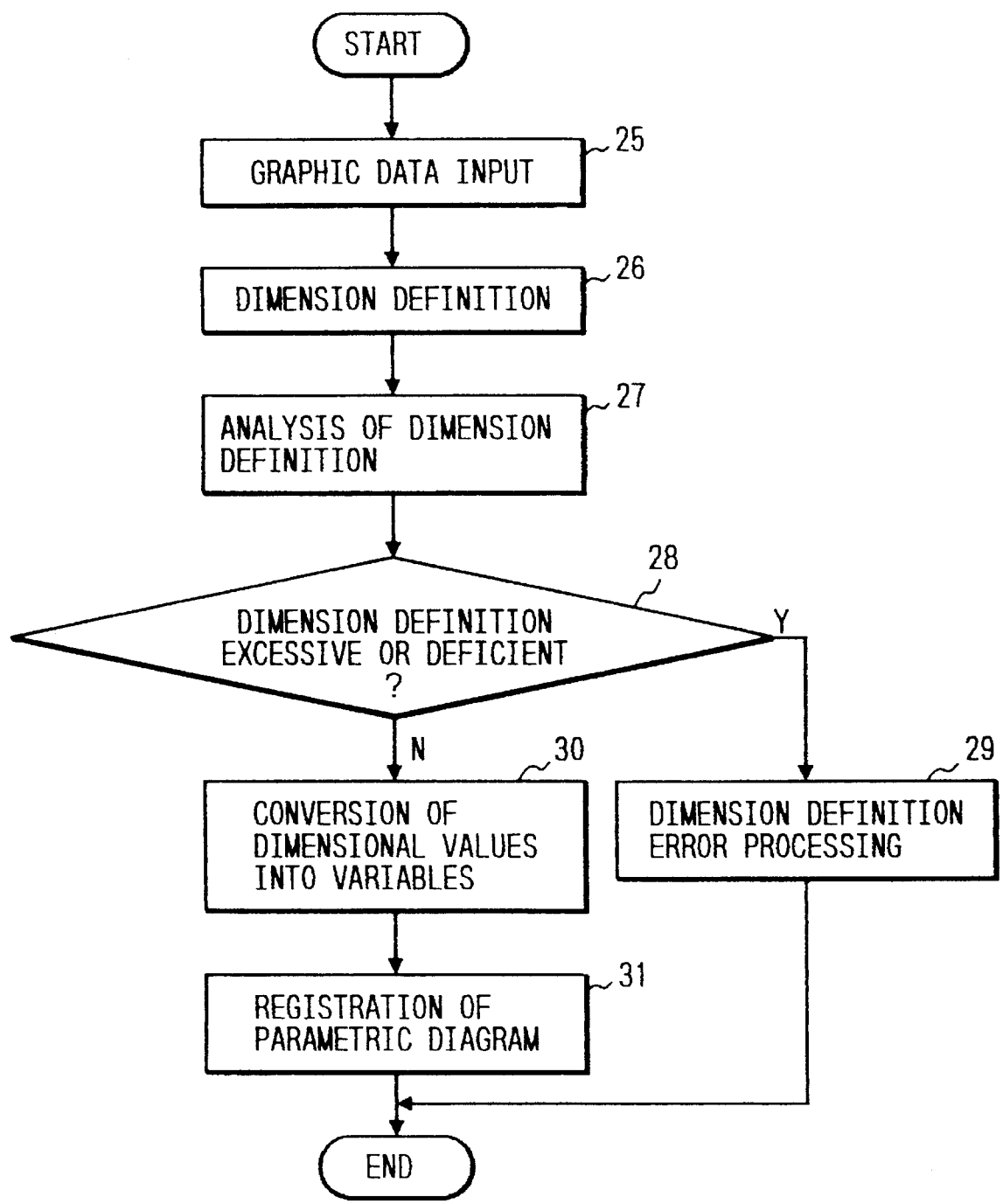
FIG. 2 is a flowchart illustrating the processing operation of parametric diagram generating means concerned with the first embodiment of the present invention.
Figure 3:
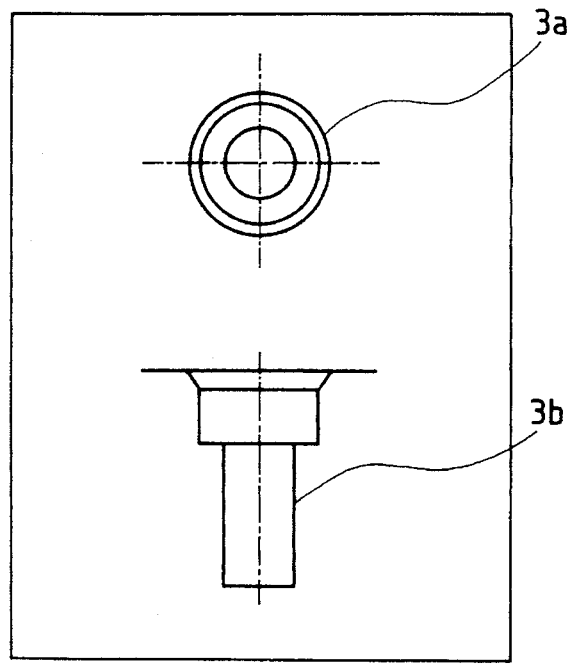
FIG. 3 shows a drawing displayed on a CRT to illustrate the result of the processing operation of the parametric diagram generating means.

The operation of this CAD/CAM apparatus will now be described with reference to the appended drawings. First, the operation of the parametric diagram generating means 5 for generating the parametric diagram will be described in accordance with FIGS. 2 to 5. FIG. 2 is a flowchart showing the processing sequence of the parametric diagram generating means 5, and FIGS. 3 to 5 show the examples of graphics displayed on the CRT 23 at the end of the corresponding parametric diagram processing operations.

In FIG. 2, first at step 25, graphic data is input from the input devices, such as the keyboard 1, mouse 2, and/or tablet 3. FIG. 3 shows an example of a graphics display that is generated after the graphic data of a hole shape is input as a top view 3a and a front view 3b. Then, at step 26, dimensions for the shape elements, as required, are defined in correspondence with the graphic data by the input devices. FIG. 4 shows an example of a graphics display that is generated when correct dimensions have been defined in a front view 4a of the hole shape. Then, at step 27, whether dimensions have been defined for the graphic data without excess or deficiency is analyzed from the characteristics of the shape and the positional relationships of the dimension locations which represent the characteristics of the shape. For example, in FIG. 4 wherein "60.0" and "14.0" are defined as hole depth dimensions, if "46.0" (=60.0−14.0) is further defined as a hole depth dimension, the definition of dimension "46.0" is judged as excessive since the relationship of "60.0=46.0+14.0" is established.

Then, at step 28, it is checked whether the dimension definition has been determined as excessive or deficient at step 27. If dimensional definition is judged as excessive or deficient, error processing is performed at step 29. If correct dimensions have been defined, the dimensional values defined are converted into "variables" as changeable dimensions at step 30.

FIG. 5 shows an example of the graphics displayed at the end of a conversion from the dimensional values of the hole shape into variables, wherein 5a and 5b indicate variables representing hole diameters, 5c and 5d indicate variables designating depths from a reference plane 5e of the hole shape, and 5f indicates a variable representing a chamfering value. The conversion of the defined dimensional values into variables as changeable dimensions is made by selecting any of the defined dimensional values with the input device such as the mouse 2, inputting a conversion command from the input device, and inputting a variable name (e.g. D1, D2) corresponding to the dimensional value selected with the input device.

Finally, at step 31, the parametric diagram generated is registered into the nominal dimension library 15 as a file.

In this manner, the number of parametric diagrams desired by the operator are generated and registered.

A nominal dimension list is then generated from the parametric diagram generated as described above. At this time, the nominal dimension list generating means 6 operates as indicated in FIG. 6.

Figure 6:
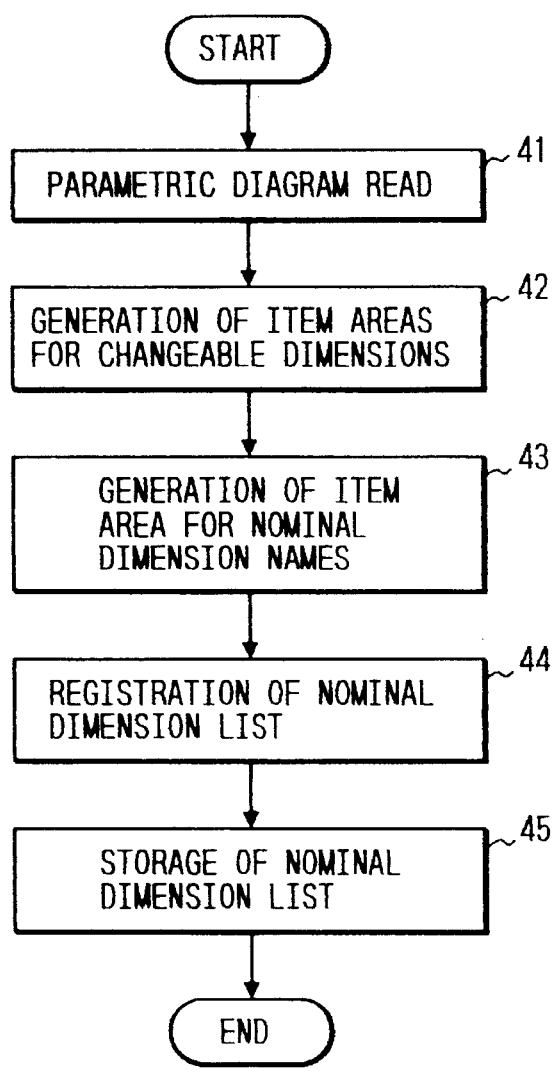
FIG. 6 is a flowchart illustrating the processing operation of nominal dimension list generating means concerned with the first embodiment of the present invention.
Figure 7:
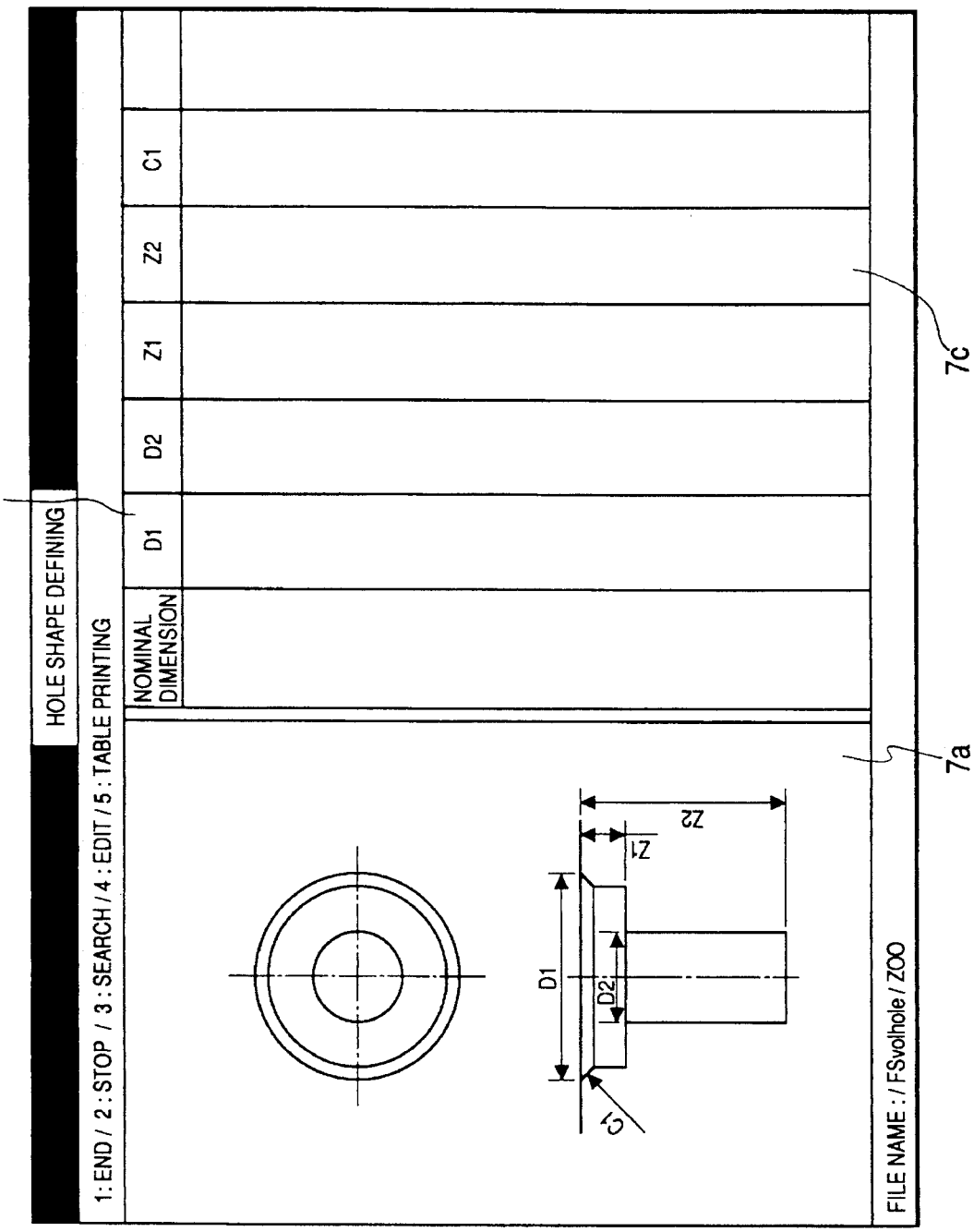
FIG. 7 shows a nominal dimension list displayed on the CRT to illustrate the result of the processing operation of the nominal dimension list generating means.

At step 41 in FIG. 6, the parametric diagram selected from among those already registered in the nominal dimension library 15 as files is read to the internal memory 13 and displayed on the CRT 23.

Then, in step 42, a predetermined input from the input device causes item areas for the input of "dimensions" to be generated, in correspondence with the several variables that appear in the read parametric diagram. Also, an item area for the "nominal dimension names" that appear in the parametric diagram is generated at step 43.

Then, at step 44, the nominal dimension names are registered into the nominal dimension name item area that has been generated in the nominal dimension list, and the nominal dimensions which allow shape data to be registered are input to the dimension input item areas.

FIG. 7 shows an example displayed on the CRT 23 at the end of the above-described operation up to step 44, wherein 7a indicates the parametric diagram of the hole shape, 7b denotes the nominal dimension name in the parametric diagram 7a and the variables of changeable dimensions, and 7c designates an area where data corresponding to the nominal dimension name and variables are input.

Finally, at step 45, the registered nominal dimension list is stored into the nominal dimension library 15. The nominal dimension list, where data corresponding to the nominal dimension name and variables have not been specified in the area 7c shown in FIG. 7, is generated as described below.

This nominal dimension list, where the data corresponding to the nominal dimension name and variables does not exist in the area 7c, is generated so that when the data corresponding to the nominal dimension name and variables is input to the area 7c, any of specific numerals, such as input condition setting condition characters (e.g. "?") preset on the system side and mixed characters of numerals and condition characters (e.g. "50?") may be input by the operation of the condition setting means 7.

That is, if shape data input values corresponding to the nominal dimension name are all numerals, they are judged as dimensional values and stored into the corresponding item areas as numerical values. Also, if the shape data input values corresponding to the nominal dimension name are condition characters, they are determined as input condition setting condition characters and are stored into the corresponding item areas as condition characters. Further, if the shape data input values corresponding to the nominal dimension name are mixed characters of numerals and condition characters, they are determined as the mixed characters of numerals and condition characters and stored into the corresponding item areas as mixed characters.

For example, if numerical values are input to all of the input items as indicated on the line of nominal dimension name "M01" in FIG. 9, the corresponding nominal dimension name is recognized as defining fixed dimensions which have fixed dimensional values. Also, if condition characters are input to some or all of the input items as indicated on the line of nominal dimension name "M02" in FIG. 9, the corresponding nominal dimension name is recognized as having input conditions and the variables related to the items having the condition characters are recognized as undefined dimensions. Further, if mixed characters of numerals and condition characters are input to some or all of the input items, as indicated on the line of nominal dimension name "M03" in FIG. 9, the corresponding nominal dimension name is recognized as having input conditions, and the variables related to the items having the mixture of numerals and condition characters are recognized as semi-undefined dimensions which may either be defined as dimensional values or changed into input conditions.

The operation of the interactive inputting means 8, which registers graphic data corresponding to the nominal dimension name and variables in the area 7c of the nominal dimension list generated by the nominal dimension list generating means 6 and edits the graphic data corresponding to the variables already input to the area 7c of the nominal dimension list, will now be described with reference to FIGS. 7 to 15. Since the condition setting means 7, nominal dimension editing means 9, nominal dimension registering means 10, nominal dimension storing means 11 and item inputting means 12 also operate when the interactive inputting means 8 operates, the operations of the means 7, 9, 10, 11, 12 will also be described.

Figure 8:
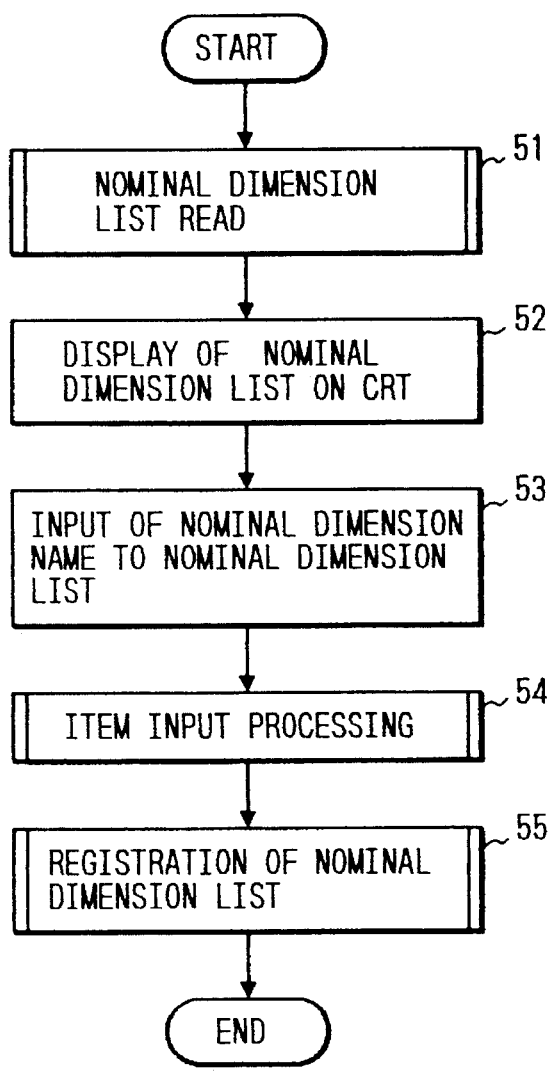
FIG. 8 is a flowchart illustrating the processing operation of interactive inputting means for registration into the nominal dimension list concerned with the first embodiment of the present invention.
Figure 10:
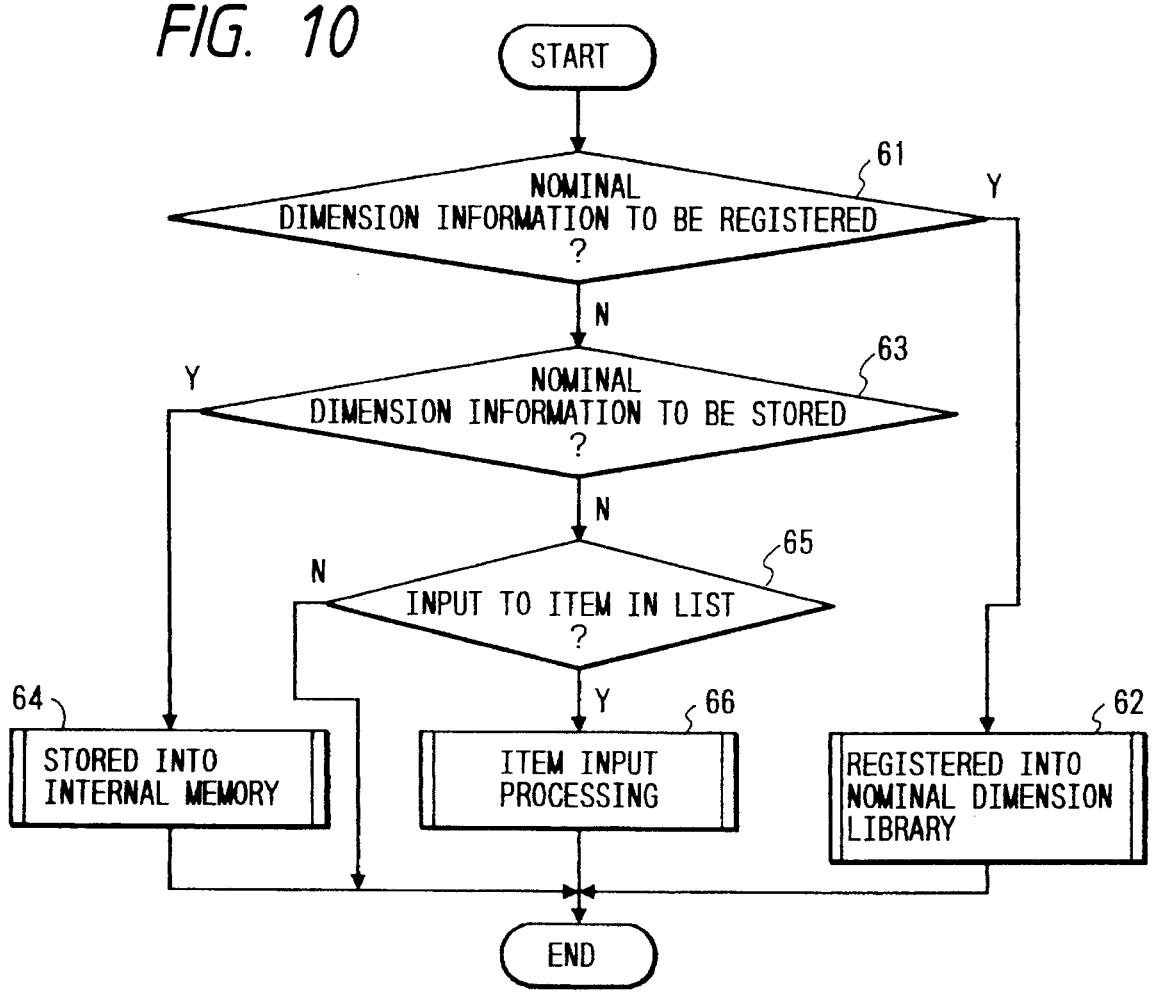
FIG. 10 is a flowchart illustrating the processing operation of nominal dimension editing means concerned with the first embodiment of the present invention.
Figure 11:
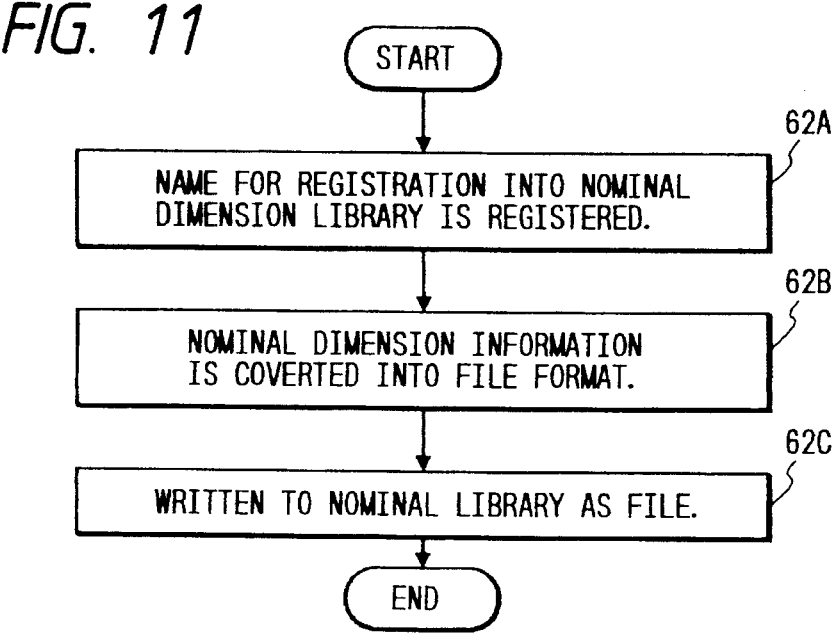
FIG. 11 is a flowchart illustrating the processing operation of nominal dimension registering means concerned with the first embodiment of the present invention.
Figure 12:
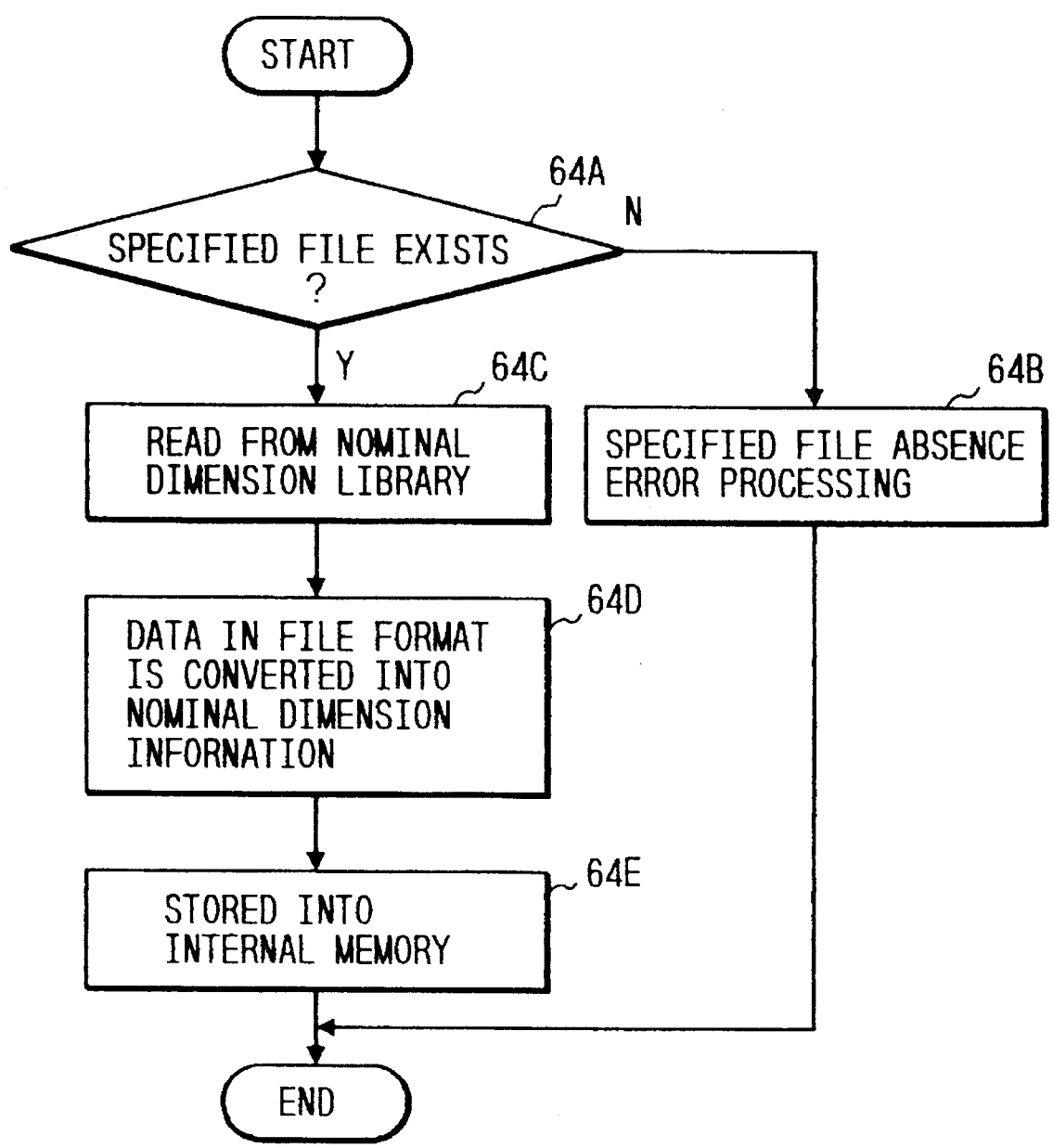
FIG. 12 is a flowchart illustrating the processing operation of nominal dimension storing means concerned with the first embodiment of the present invention.
Figure 13:
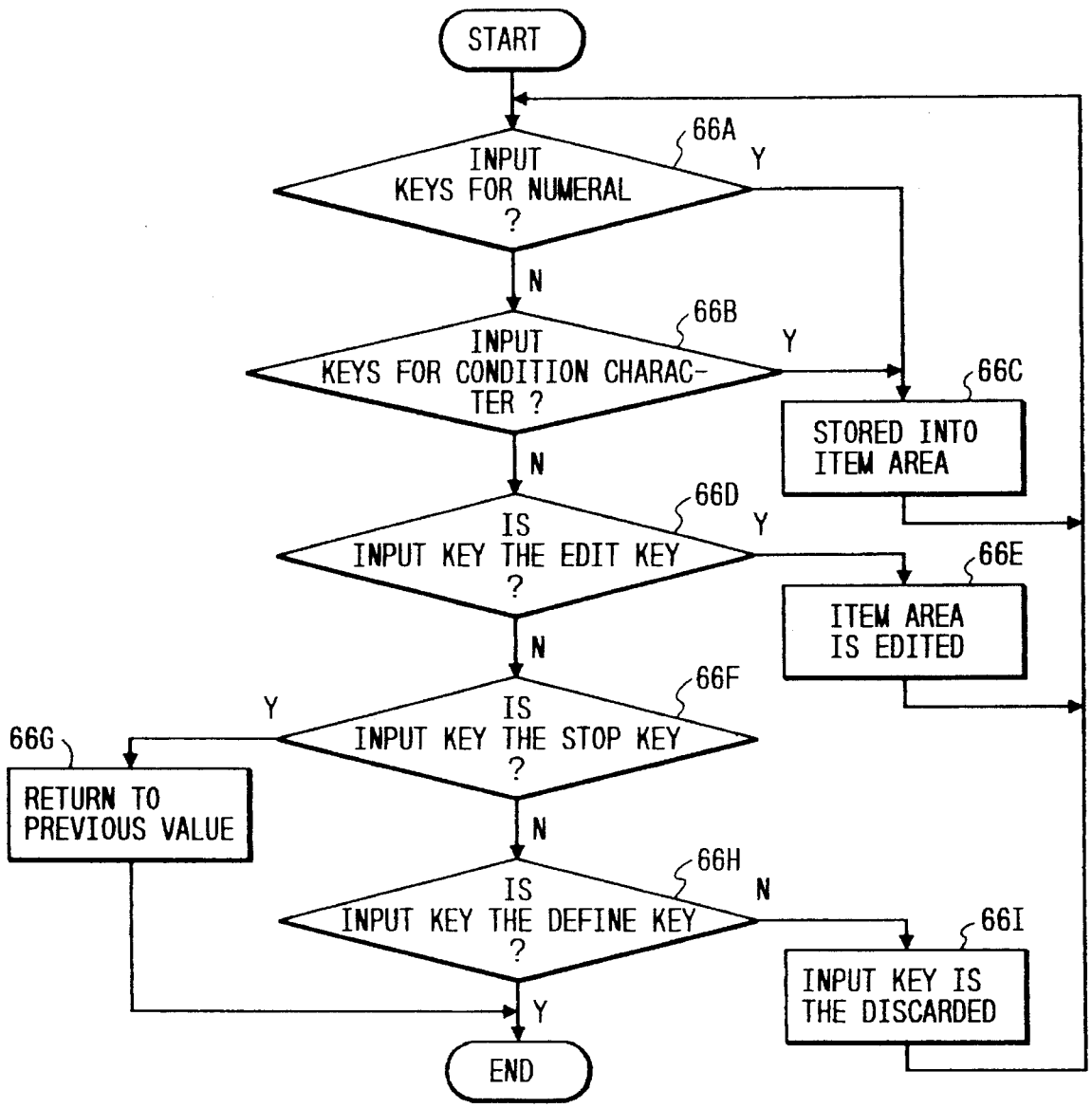
FIG. 13 is a flowchart illustrating the processing operation of item inputting means concerned with the first embodiment of the present invention.
Figure 14:
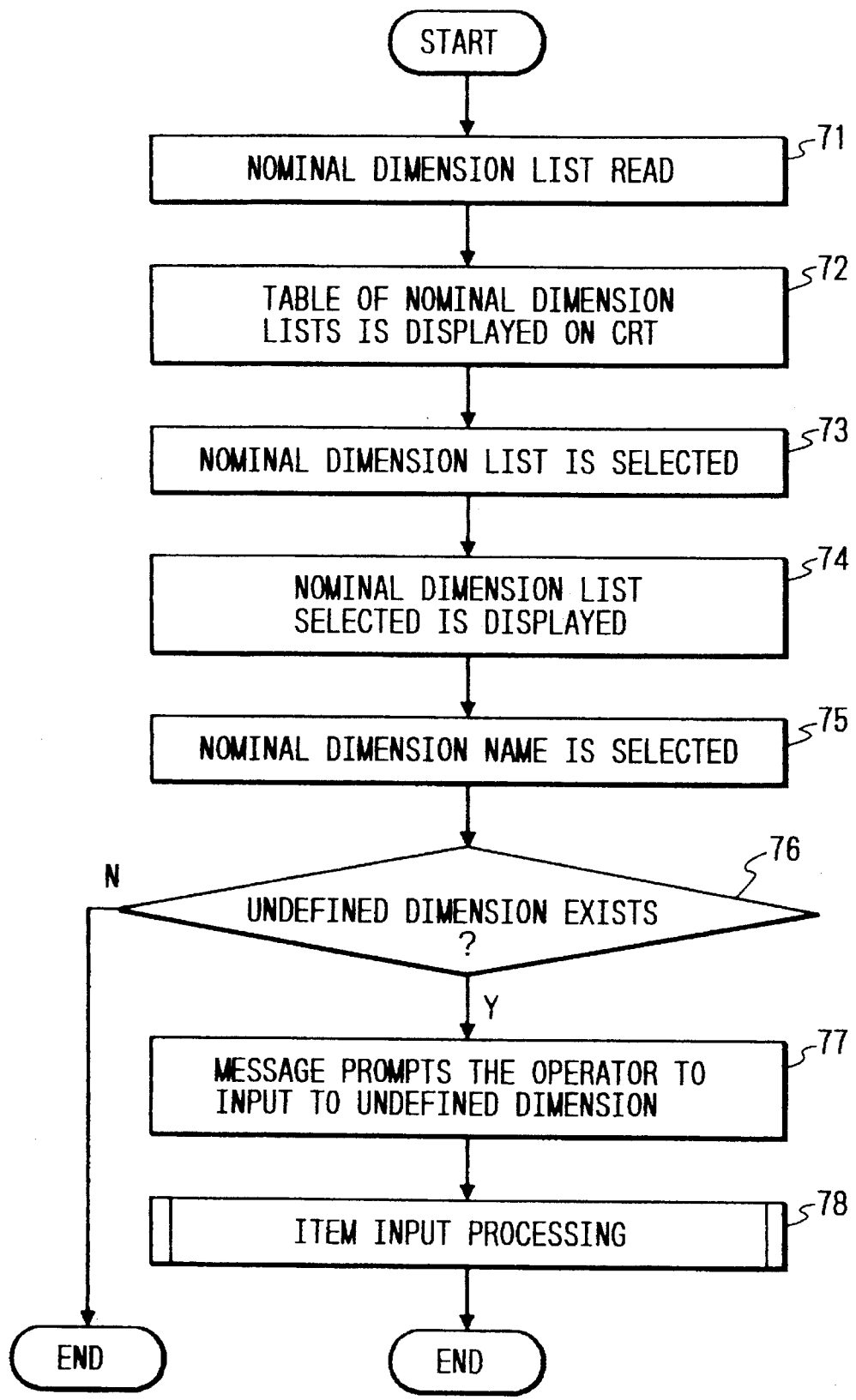
FIG. 14 is a flowchart illustrating the processing operation of the interactive inputting means for quotation of the nominal dimension list concerned with the first embodiment of the present invention.
Figure 15:
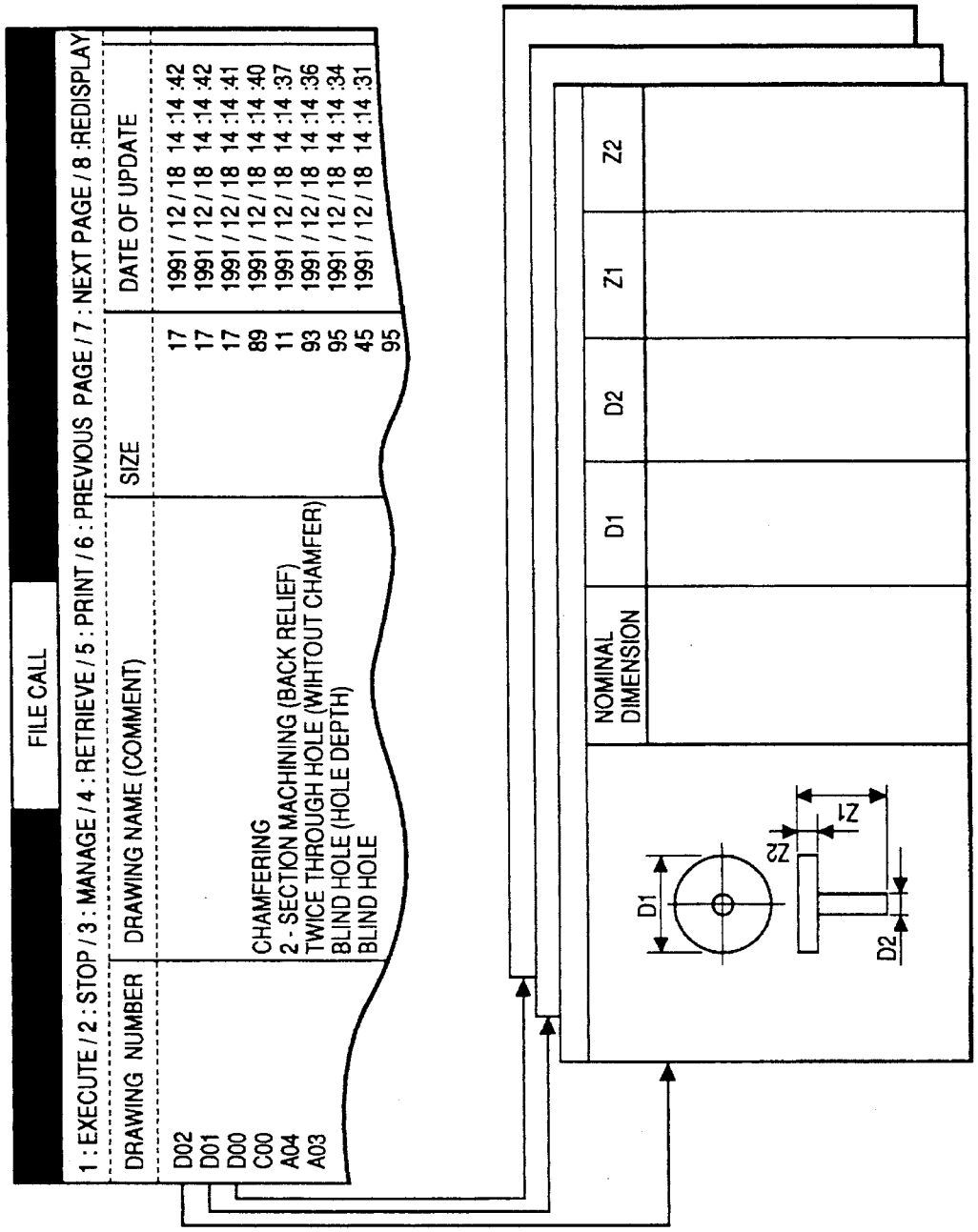
FIG. 15 shows a table of nominal dimension lists to illustrate the result of the processing operation of the interactive inputting means.

FIGS. 8 and 14 are flowcharts illustrating the main operation of the interactive inputting means 8. More specifically, FIG. 8 is a flowchart which illustrates how data corresponding to the nominal dimension name and variables is input to the nominal dimension list where the data corresponding to the nominal dimension name and variables does not exist in the area 7c. FIG. 14 is a flowchart which illustrates how graphic data corresponding to variables already input to the area 7c of the nominal dimension list is edited. FIG. 7 shows a nominal dimension list where data corresponding to the nominal dimension name and variables does not exist in the area 7c. FIG. 9 shows a nominal dimension list where data corresponding to the nominal dimension name and variables exists in the area 7c. FIG. 10 is a flowchart which indicates the operation of the nominal dimension editing means 9. FIG. 11 is a flowchart which indicates the operation of the nominal dimension registering means 10. FIG. 12 is a flowchart indicating the operation of the nominal dimension storing means 11. FIG. 13 is a flowchart indicating the operations of the condition setting means 7 and item inputting means 12, and FIG. 15 shows a table of nominal dimension lists.

First, a sequence for inputting data corresponding to the nominal dimension name and variables to a nominal dimension list where data corresponding to the nominal dimension name and variables does not exist in the area 7c will be described. That is, at step 51 in FIG. 8, a nominal dimension list which has been registered in the nominal dimension library 15 as a file and where data corresponding to the nominal dimension name and variables does not exist in the area 7c is read to the internal memory 13. This reading is done by the operations of the nominal dimension editing means 9 and nominal dimension storing means 11. As shown in FIG. 10 first, it is judged whether "nominal dimension information" (a parametric diagram and a nominal dimension list corresponding to this parametric diagram) is stored in the internal memory 13 at step 63. If it is so judged, then nominal dimension information selected from among those already registered in the nominal dimension library 15 as files is read to the internal memory 13 at step 64. Specifically, with reference to FIG. 12, it is determined at step 64A whether or not the specified file exists. If it has been judged that the specified file exists, it is read from the nominal dimension library 15 at step 64C. Then, the data in the file format is converted into nominal dimension information at step 64D, and finally stored into the internal memory 13 at step 64E. If it has been determined at step 64A that the specified file does not exist, error processing is carried out (step 64B). In this way, the nominal dimension list which has been registered in the dimension library 15 as a file and where data corresponding to the nominal dimension name and variables does not exist in the area 7c is read to the internal memory 13.

Referring again to FIG. 8, the nominal dimension list read at step 51 is displayed on the CRT 23 at step 52 (shown in FIG. 7), and the nominal dimension name is input to the area 7c of the nominal dimension list from the input device at step 53. Then, at step 54, data corresponding to the variables is input to the area 7c of the nominal dimension list. This input is conducted by the operations of the condition setting means 7, nominal dimension editing means 9 and item inputting means 12. As shown in FIG. 10, if it has been judged at step 65 that input to the items of the nominal dimension list is performed, item input processing is carried out at step 66. Specifically (step 66), if it has been determined at step 66A that the input keys used are numeral keys as indicated in FIG. 13, the corresponding numerical value is stored into the corresponding item area at step 66C. Also, if it has been determined at step 66A that the input keys used are not numeral keys, the processing moves to step 66B. If it is judged at step 66B that the input keys used are condition characters (including mixed characters of numerical value and condition character), the condition characters are stored into the corresponding item area at step 66C.

If it is judged at step 66B that the input keys used are not condition characters (including mixed characters of numerical values and condition characters), the processing transfers to step 66D. If it is determined at step 66D that the input key used is any of the edit keys (e.g. delete key, cursor move keys), edition such as delete or insert is made to a character string in the item of the nominal dimension list at step 66E. It has been determined at step 66D that the input key used is not any of the edit keys, the processing transfers to step 66F. If it has been determined at step 66F that the input key used is the stop key, a previous value (for example, "50" in the case of a semi-undefined dimension input as "50?") in the item of the nominal dimension list is set at step 66G and the processing is terminated. If it has been determined at step 66F that the input key used is not the STOP key, the processing transfers to step 66H.

If it has been determined at step 66H that the input key used is a DEFINE key (such as the RETURN key), the processing is terminated. If the key is not the DEFINE key either, it means that an invalid key has been pressed. Hence, the data input by that invalid key is discarded at step 66I, the operation returns again to step 66A, and the processing is repeated.

As described above, the data corresponding to the nominal dimension name and variables is stored into the nominal dimension list where the data corresponding to the nominal dimension name and variables does not exist in the area 7c.

FIG. 9 shows the nominal dimension list displayed on the CRT 23 at the end of such processing. 7d in FIG. 9 indicates a cursor, which is moved to a desired position in the nominal dimension list to input data in the desired item area.

If the shape data input values corresponding to the nominal dimension name input by the operation of the condition setting means 7 are all numerals, as described above, at the end of such processing, those values are judged as dimensional values and stored into the corresponding item areas as numerical values. Also, if the shape data input values corresponding to the nominal dimension name are input condition setting condition characters, they are judged as input condition setting condition characters and stored into the corresponding item areas as condition characters. Further, if they are mixed characters of numerals and condition characters, they are judged as mixed characters of numerals and condition characters and stored into the corresponding item areas as mixed characters.

For example, if numerical values are input to all of the input items as indicated on the line of nominal dimension name "M01" in FIG. 9, the corresponding nominal dimension name is recognized as fixed dimensions which are fixed in dimensional values. Also, if condition characters are input to some or all of the input items as indicated on the line of nominal dimension name "M02" in FIG. 9, the corresponding nominal dimension name is recognized as having input conditions and the variables related to the items having the condition characters are recognized as undefined dimensions. Further, if mixed characters of numerals and condition characters are input to some or all of the input items as indicated on the line of nominal dimension name "M03" in FIG. 9, the corresponding nominal dimension name is recognized as having input conditions, and the variables related to the items having the mixture of numerals and condition characters are recognized as semi-undefined dimensions which may either be defined as dimensional values or changed into input conditions.

Referring again to FIG. 8, finally, the nominal dimension list is written and registered into the nominal dimension library 15 as a file at step 55. This registration is made by the operations of the nominal dimension editing means 9 and nominal dimension registering means 10. First, as indicated in FIG. 10, if it has been determined at step 61 that nominal dimension information is registered, the nominal dimension information (a parametric diagram and a nominal dimension list where data exists) generated is registered into the nominal dimension library 15 as a file at step 62. Specifically, with reference to FIG. 11, a registration name is input to the nominal dimension information from the input device at step 62A, the nominal dimension information is then converted into a file format at step 62B, and is finally written and registered into the nominal dimension library 15 as a file at step 62C.

The operation of the interactive inputting means 8 for the editing of graphic data corresponding to the variables already existing in the area 7c of the nominal dimension list will now be described in accordance with FIG. 14.

Namely, referring to FIG. 14, the nominal dimension list registered in the nominal dimension library 15 as a file is read to the internal memory 13 at step 71. This reading is done by the operations of the nominal dimension editing means 9 and nominal dimension storing means 11. Since these operations have already been described specifically, they will not be described here.

Then, at step 72, a table showing a plurality of nominal dimension lists registered in the nominal dimension library 15 as files is displayed on the CRT 23 as shown in FIG. 15, and at step 73, an appropriate nominal dimension list is selected from the displayed table of the nominal dimension lists by using the input devices such as the keyboard 1, mouse 2 and/or tablet 3. Then, at step 74, the nominal dimension list selected at step 73 is displayed on the CRT 23 and, at step 75, an appropriate nominal dimension name is selected from the displayed nominal dimension list by using the input devices such as the keyboard 1, mouse 2 and/or tablet 3.

Then, at step 76, it is checked whether the value stored in each variable of the changeable dimensions corresponding to the nominal dimension name selected is a fixed dimension which is a numerical value, an undefined dimension which is a condition character, or a semi-undefined dimension which is a mixed character of numerical value and condition character. If the values of all variables corresponding to the nominal dimension name are fixed dimensions, this processing is terminated. If it has been determined at step 76 that the values are undefined dimensions which are condition characters, or semi-undefined dimensions which are mixed characters of numerical values and condition characters, the processing transfers to step 77, wherein the apparatus displays on the CRT 23 a message which prompts the operator to input to the undefined dimensions or semi-undefined dimensions and waits for the operator to input.

Then, at step 78, item input processing is performed. This item input processing is carried out by the operations of the condition setting means 7, nominal dimension editing means 9 and item inputting means 12. Since these specific operation have already described, they will therefore not described here.

The nominal dimension list is edited as described above.

By generating the nominal dimension list as described above, this nominal dimension list can be quoted to generate a desired projection drawing or stereoscopic drawing and add machining conditions to the projection drawing or stereoscopic drawing generated.

The operation of the projection drawing generating means 16, which generates and locates a projection drawing using said nominal dimension list generated, will now be described in accordance with FIGS. 16 and 17.

Figure 16:
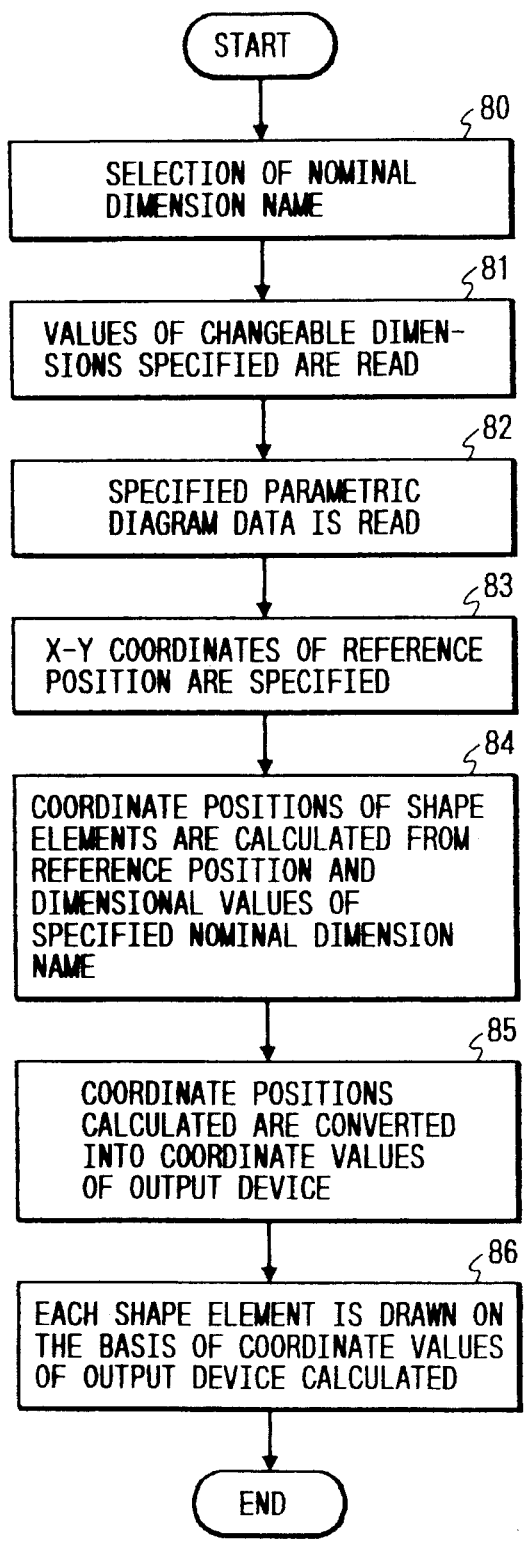
FIG. 16 is a flowchart illustrating the processing operation of projection drawing generating means concerned with the first embodiment of the present invention.
Figure 17:
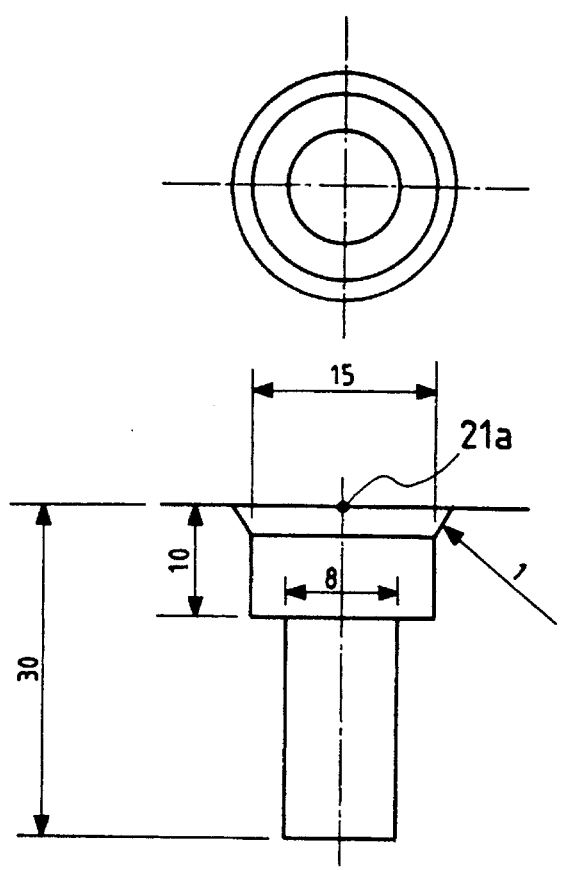
FIG. 17 shows a drawing displayed on the CRT to illustrate the result of the processing operation of the projection drawing generating means.

Namely, referring to FIG. 16, a nominal dimension name in the nominal dimension list (called and displayed on the CRT 23 as indicated in FIG. 14) is selected at step 80 using the input device. Then, the value of each variable of the changeable dimensions corresponding to the specified nominal dimension name is read at step 81, and the data of a parametric diagram corresponding to the specified nominal dimension name is read at step 82. Then, a reference position (X–Y coordinates, e.g. position 21a in FIG. 17) employed to locate the shape of the selected nominal dimension name at a specified position as a projection drawing is specified at step 83, and the coordinate positions of shape elements are calculated from the specified reference position and the dimensional values of the specified nominal dimension name at step 84. For example, if the shape element is a segment, the coordinate values at both ends of the segment are calculated, and if it is a circle (including an arc), the center coordinate value and radius of the circle are calculated. Then, the coordinate values calculated at step 84 are converted into the coordinate values of the output device, such as the CRT 23 or a plotter, at step 85 to be output to the output device, and each shape element is drawn at step 86 by using the coordinate values of the output device calculated.

The operation of the stereoscopic drawing generating means 17, which generates and locates a stereoscopic drawing using the nominal dimension list generated, will now be described in accordance with FIGS. 18 and 19.

Figure 18:
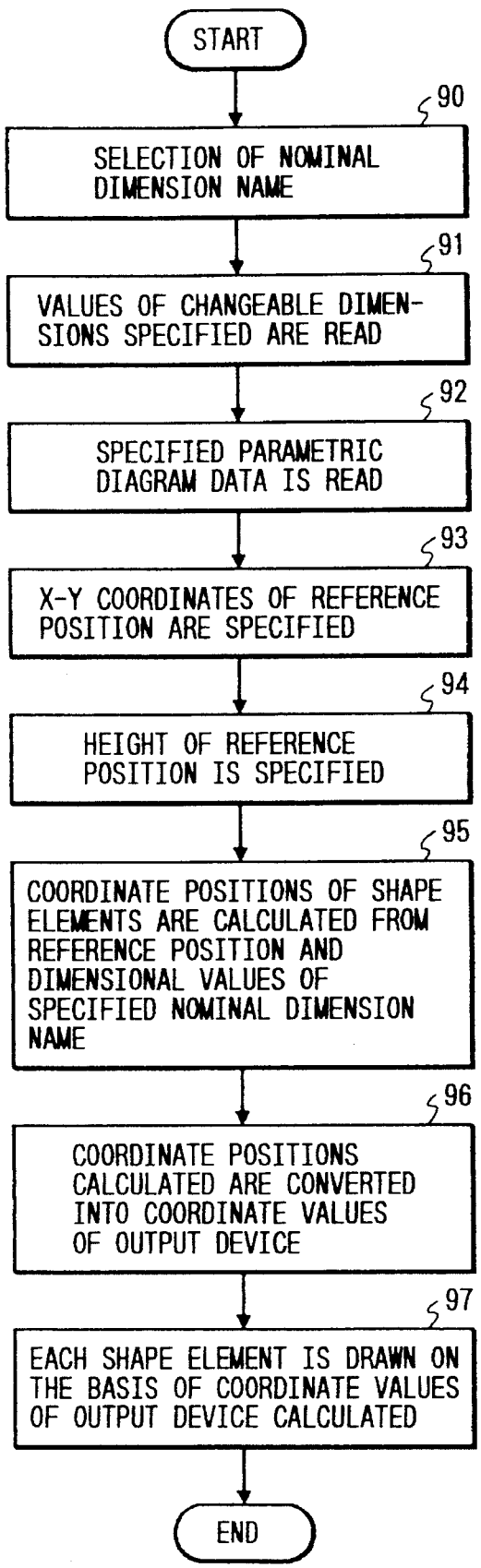
FIG. 18 is a flowchart illustrating the processing operation of stereoscopic drawing generating means concerned with the first embodiment of the present invention.
Figure 19:
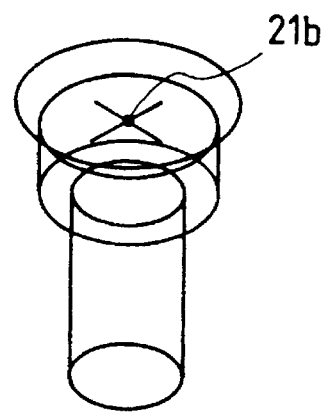
FIG. 19 shows a drawing displayed on the CRT to illustrate the result of the processing operation of the stereoscopic drawing generating means.

Namely, referring to FIG. 18, a nominal dimension name in the nominal dimension list (called and displayed on the CRT 23 as indicated in FIG. 14) is selected at step 90 using the input device. Then, the value of each variable of the changeable dimensions corresponding to the specified nominal dimension name is read at step 91, and the data of a parametric diagram corresponding to the specified nominal dimension name is read at step 92. Then, a reference position (X–Y coordinates, e.g. position 21b in FIG. 19) used to locate the shape of the selected nominal dimension name at a specified position as a projection drawing is specified at step 93, and in addition to the X–Y coordinate values, a height is specified to locate the shape as a stereoscopic drawing at a specified position at step 94. Then, the three-dimensional coordinate values of shape elements are calculated from the specified reference position, the height, and the dimensional values of the specified nominal dimension name at step 95, and the coordinate values calculated at step 95 are converted into the coordinate values of the output device, such as the CRT 23 or plotter, at step 96 to be output to the output device (this coordinate conversion processing converts three-dimensional coordinate values into two-dimensional conversion values), and each shape element is drawn at step 97 by using the coordinate values of the output device calculated.

Figure 20:
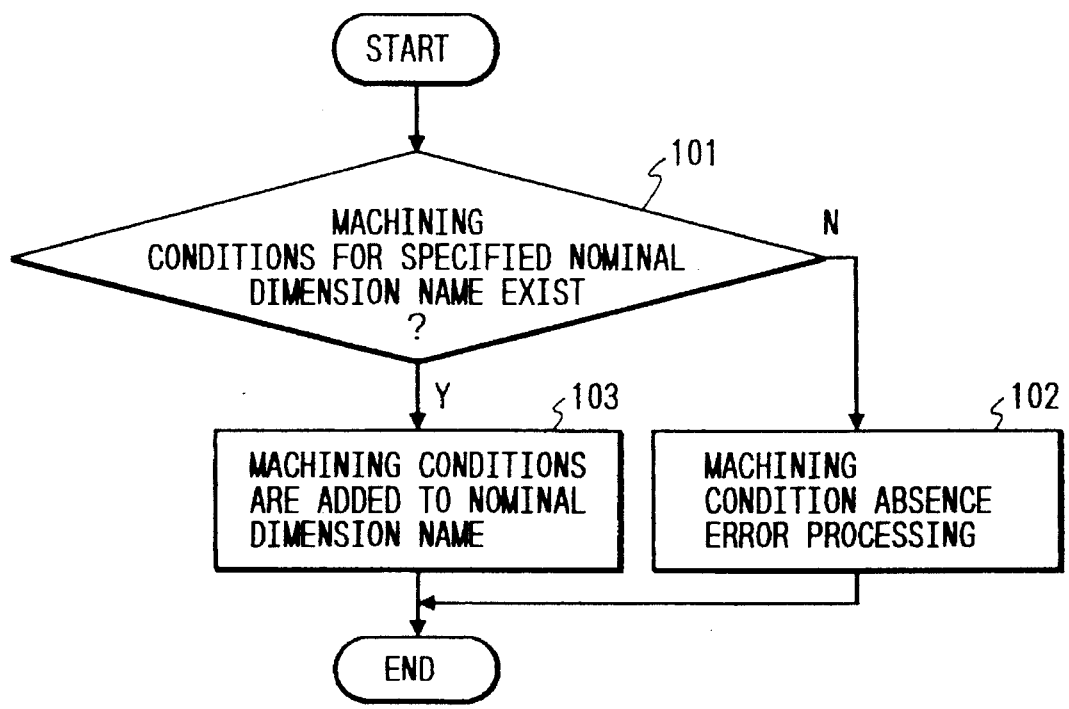
FIG. 20 is a flowchart illustrating the processing operation of machining condition adding means concerned with the first embodiment of the present invention.

The operation of the machining condition adding means 18, which adds machining conditions to a shape generated and located by the projection drawing generating means 16 or stereoscopic drawing generating means 17, will now be described with reference to FIGS. 20 and 21. That is, it is checked at step 101 whether machining conditions (FIG. 21) corresponding to the specified nominal dimension name exist or not. If machining conditions do not exist at step 101, error processing is performed at step 102. If it has been determined at step 101 that machining conditions exist for that shape, the machining conditions corresponding to the nominal dimension name are added to the nominal dimension name and stored at step 103. Consequently, the machining conditions correspond to the nominal dimension name. By indicating the shape, therefore, the machining conditions corresponding thereto can be added.

FIG. 21 shows a machining condition list for hole machining, wherein 21a indicates conditions required to generate a hole machining program. The hole machining type in said conditions indicates the type of a machining process which is classified into centering, drilling, spot facing and chamfering. The process division determines the output sequence of a machining program. The tool name represents the name of a pre-registered tool used for that machining. The spindle speed specifies the spindle speed of machining equipment. The machined surface safety allowance controls the motion of the tool so that the tool and a workpiece do not collide. 21b indicates an area in which conditions are set to said machining conditions and a preset example is being shown. Here, setting has been made to carry out four types of machining in order to machine a single hole. 21c corresponds to nominal dimension name "M01" in FIG. 9. Namely, nominal dimension name "M01" has been quoted, machining conditions matching nominal dimension name "M01" are searched from among the machining conditions registered by the machining condition adding means, and the machining conditions are connected with the hole shape quoted. 21d indicates commands which are used, for example, to edit, e.g. input and deletion to the item areas of the machining condition list, and to print and register a list.

Finally, an NC program is generated by the shape analyzer 19 and NC data generator 20 using the shape data and machining conditions.

Figure 22:
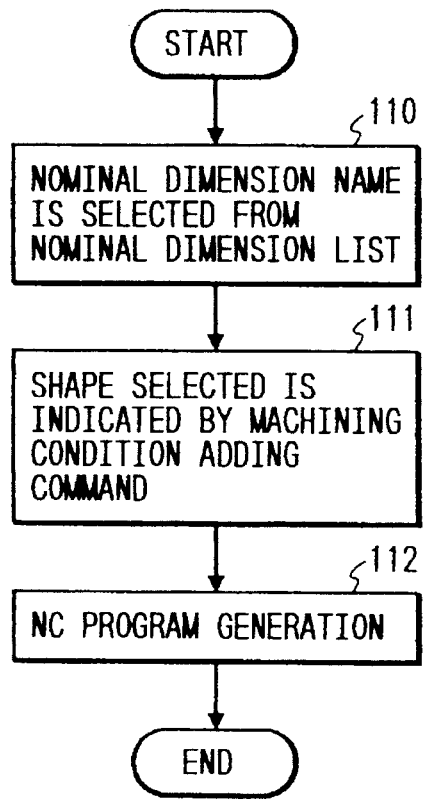
FIG. 22 is a flowchart illustrating NC program generation concerned with the first embodiment of the present invention.

When the NC program is generated, without the data of the nominal dimension list being changed, after the nominal dimension list has already been created, it is only necessary to select a nominal dimension name from the nominal dimension list (step 110) and indicate the shape selected by the machining condition adding command (step 111) in order to generate the NC program (step 112) as indicated in FIG. 22.

Figure 23A:
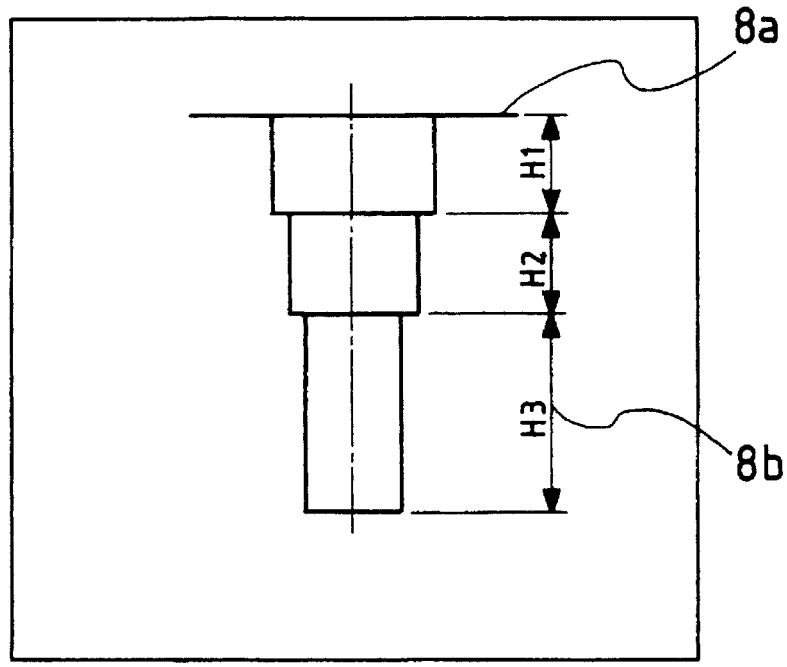
FIGS. 23(A–B) are parametric diagrams concerned with the second embodiment of the present invention.
Figure 23B:
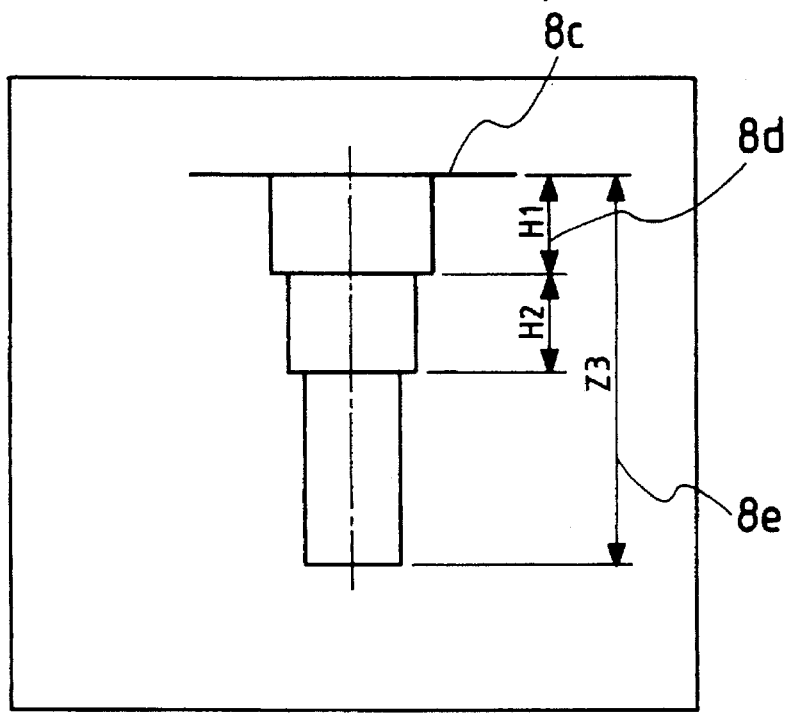

Whereas the dimensional values 5c, 5d of the hole shape are converted into variables which indicate depths from the reference plane 5e in FIG. 5 in the first embodiment, they may be converted into variables 8b which do not indicate depths from a reference plane 8a but indicate depth lengths as shown in FIG. 23(a), or further may be converted into a mixture of a variable 8e which indicates a depth from a reference plane 8c and variables 8d which indicate depth lengths as shown in FIG. 23(b).

While the table of nominal dimension lists is first displayed on the CRT 23 and the nominal dimension list is then selected from the table of nominal dimension lists displayed on the CRT 23 using the input device as indicated in FIG. 14 to select the nominal dimension name from the nominal dimension list registered in the nominal dimension library 15 in the first embodiment, the nominal dimension name may be called by directly inputting the nominal dimension list name and nominal dimension name from the keyboard without displaying the table of nominal dimension lists on the CRT 23.

Although the parametric diagram and the nominal dimension list where data corresponding to the nominal dimension name and variables does not exist in the area 7c are registered into the nominal dimension library 15 every time their generation processing ends in the first embodiment, they need not be registered into the nominal dimension library 15 every time their generation processing ends, i.e. said generation processing may transfer to next processing on the level of storage into the internal memory 13.

Further, in the first embodiment, when the nominal dimension list is quoted (utilized), the input keys are used to input an undefined dimension (e.g. "?") corresponding to the variable already input to the area 7c as a specific numerical value or to change a semi-undefined dimension (e.g. "50?") into a numerical value other than the numerical value already input. In these cases, the shape indicating means 24 may be used to input said values as specific numerical values as described below.

Figure 24:
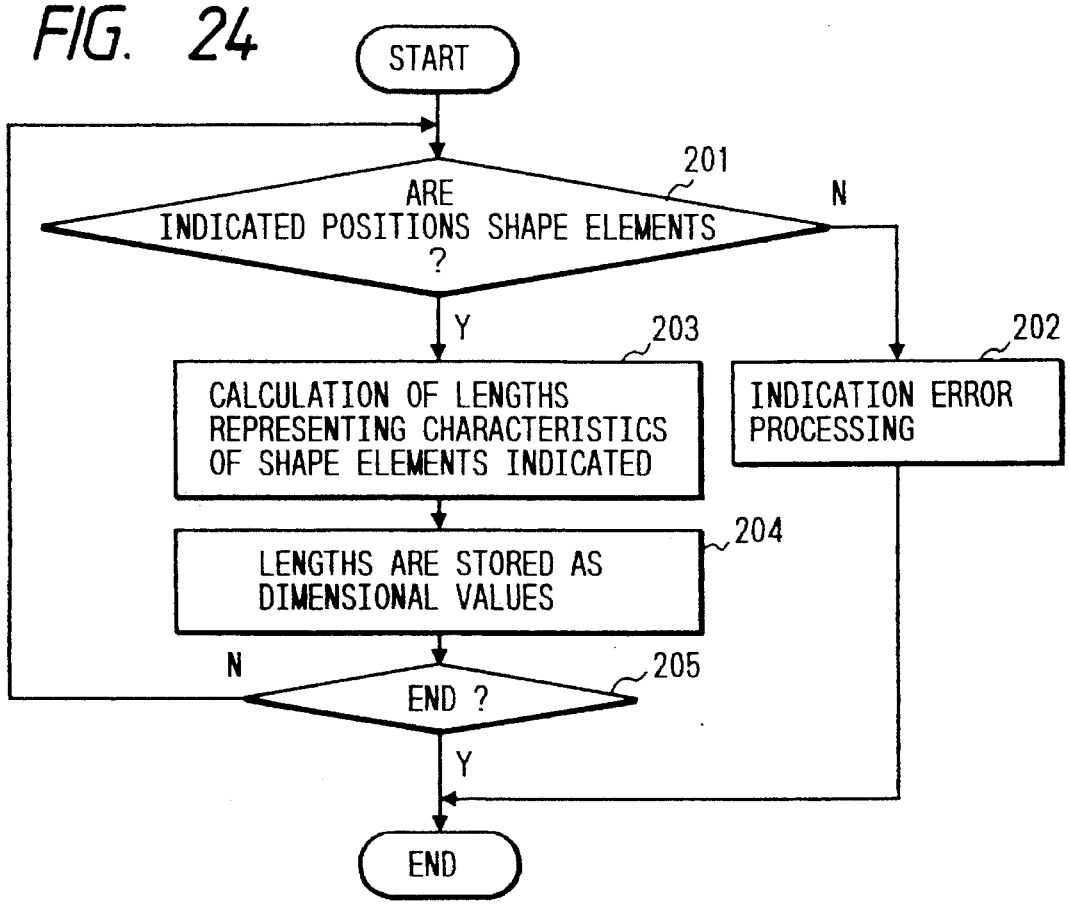
FIG. 24 is a flowchart illustrating the processing operation of shape indicating/inputting means concerned with an embodiment of the present invention.
Figure 27:
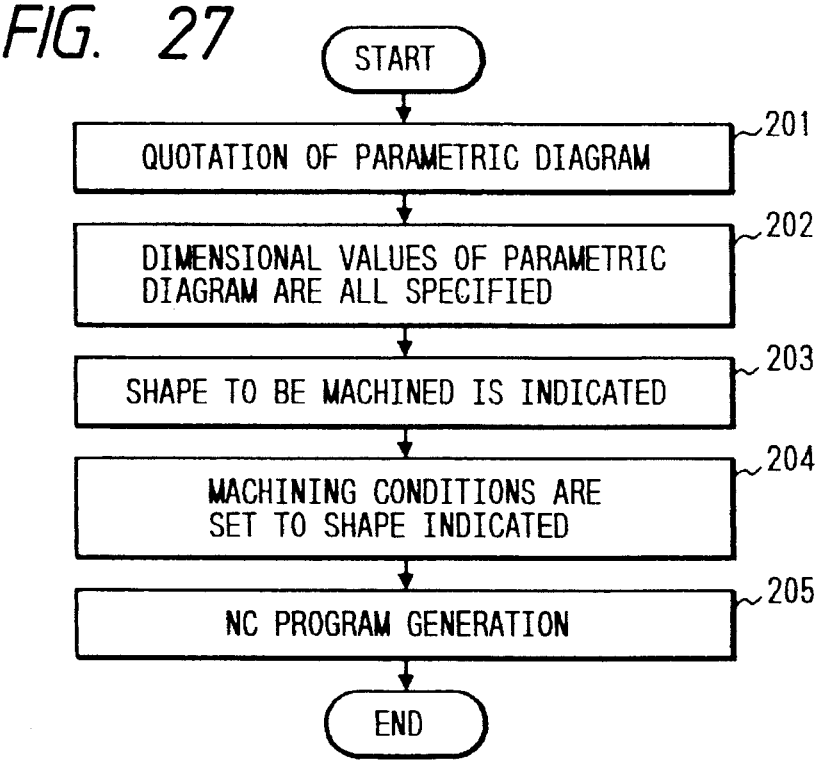
FIG. 27 is a flowchart illustrating NC program generation known in the art.

FIG. 24 is a flowchart illustrating the operation of the shape indicating means 24. At step 201, it is checked whether the positions indicated by the indication-type input device, such as the mouse or tablet, match the positions of the shape elements displayed on the CRT 23. If the indicated positions do not match the shape element positions, error processing is performed at step 202. If the indicated positions match the shape element positions, the dimensions, such as lengths, representing the characteristics of the shape elements indicated are calculated from the shape data.

Figure 25A:
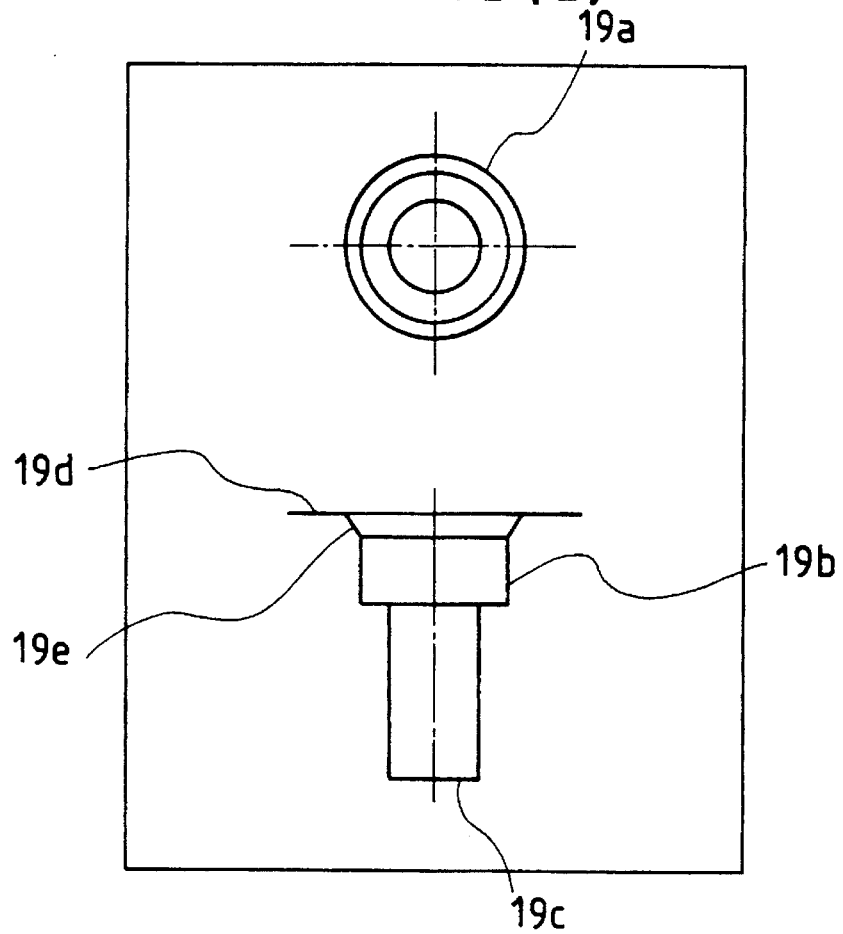
FIGS. 25(A–B) show correspondences between shape elements and dimensions to illustrate the result of the processing operation of the shape indicating/inputting means.
Figure 25B:
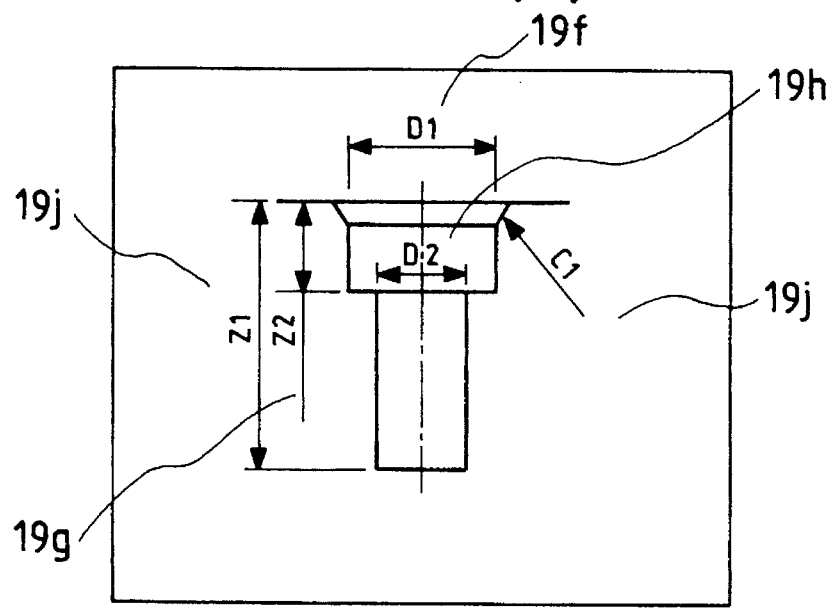
Figure 26:
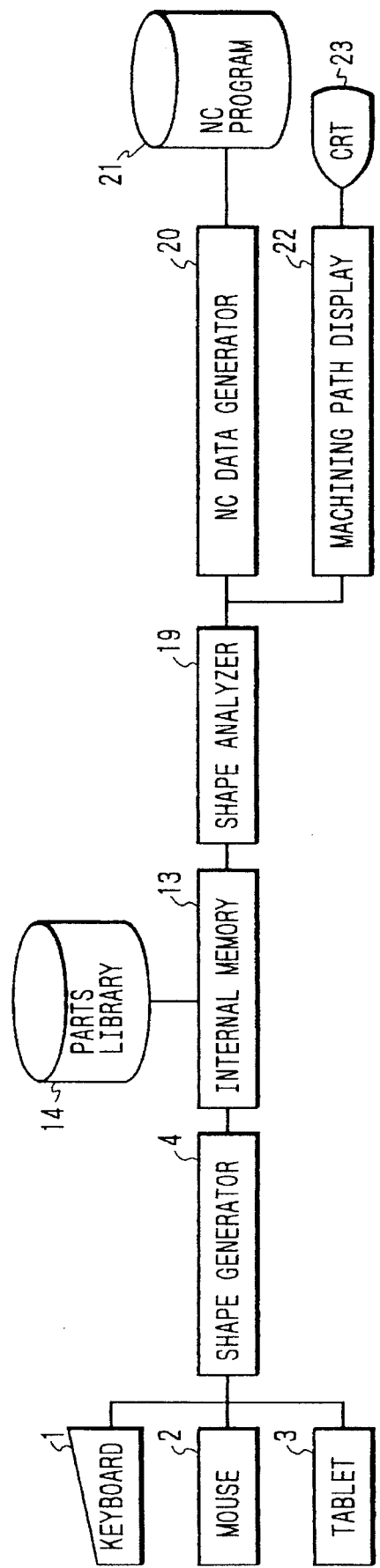
FIG. 26 illustrates the arrangement of a CAD/CAM apparatus known in the art.

A specific example will now be described in accordance with FIGS. 25(a) and (b). FIG. 25(a) is a hole shape diagram, wherein 19a to 19e indicate shape elements representing a circle, a vertical segment, a horizontal segment, a horizontal segment and an oblique segment, respectively. FIG. 25(b) is a hole shape parametric diagram, wherein 19f to 19j indicate the variables of changeable dimensions representing a first-stage hole diameter, a first-stage hole depth, a second-stage hole diameter, an overall hole depth and a chamfering value, respectively. That is, when the circle 19a of the shape elements has been indicated, its diameter is defined as the dimensional value of the first-stage hole diameter 19f. Similarly, when the vertical segment 19b of the shape elements has been indicated, its segment length is defined as the dimensional value of the first-stage hole depth 19g. Also, when the horizontal segment 19c of the shape elements has been indicated, its segment length is defined as the dimensional value of the second-stage hole diameter 19h. Also, when the two horizontal segments 19d and 19c have been indicated, the distance between these shape elements is defined as the dimensional value of the overall hole depth 19i. Further, the sine length of the oblique segment 19e is defined as the dimensional value of the chamfering value 19j.

As described above, the dimensions such as lengths representing the characteristics of the indicated shape elements are calculated from the shape data at step 203.

Then, at step 204, the lengths of the shape elements calculated at step 203 are stored into the items of changeable dimensions in said nominal dimension list as the dimensional values. Step 205 is a step wherein it is checked whether input is terminated or not. If input is not terminated, processing is repeated.

While the first embodiment was described by taking the CAD/CAM apparatus as an example, the present invention is applicable to a numerical control apparatus equipped with an automatic programming unit having a plotting function.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A drawing processor comprising:

parametric diagram generating means for generating a parametric diagram comprising at least one variable parameter; and nominal dimension list generating means for generating a nominal dimension list having data input areas, wherein data related to a plurality of shapes based on said parametric diagram and related to said at least one variable parameter in said parametric diagram is input to, and simultaneously displayed in, each of said data input areas.

2. The drawing processor as defined in claim 1, further comprising means for accessing said data input areas for at least one of generating drawing displays and generating machining instructions.

3. The drawing processor as defined in claim 1 further comprising means for inputting shape data and nominal dimension names, wherein said nominal dimension list comprises input areas wherein shape data corresponding to said parametric diagram and nominal dimension names corresponding to said shape data can be input.

4. The drawing processor as defined in claim 2, wherein said means for accessing is operative to access data from said nominal dimension list and data defining said parametric diagram.

5. The drawing processor as defined in claim 1, wherein said nominal dimension list comprises optional input areas for data input conditions and said processor further comprises:

condition setting means for setting a data inputting condition into optional items in said data input areas corresponding to said parametric diagram in said nominal dimension list.

6. The drawing processor as defined in claim 5, wherein said data inputting conditions set by said condition setting means comprises a condition under which at least one of (1) numerical values defining input data as fixed dimensions, (2) condition characters defining input data as undefined dimensions, and (3) mixed characters of numerical values and condition characters defining input data as semi-undefined dimensions, can be input.

7. The drawing processor as defined in claim 1, further comprising:

display means for displaying said nominal dimension list generated by said nominal dimension list generator means; and interactive inputting means for allowing data input to be made interactively to optional items of said data input areas in the nominal dimension list displayed by said display means.

8. The drawing processor as defined in claim 7, which further comprises nominal dimension editing means, said editing means comprising:

first and second storing means;

nominal dimension registration means for registering nominal dimension information combining said parametric diagram and said input data stored in said nominal dimension list into said first storing means as a file for machine control processing;

nominal dimension storing means for storing into said second storing means said nominal dimension information, including said data input to said optional items of said data input areas, stored as a file in said first storing means; and item inputting means for checking and storing said data input to said optional items of said data input areas of said nominal dimension information stored in said second storing means.

9. The drawing processor as defined in claim 1, which further comprises:

projection drawing generating means for plotting a projection drawing according to the data input to said nominal dimension list corresponding to said parametric diagram.

10. The drawing processor as defined in claim 1, which further comprises:

stereoscopic drawing generating means for plotting a stereoscopic drawing according to the data input to said nominal dimension list and corresponding to said parametric diagram.

11. The drawing processor as defined in claim 1, which further comprises:

an input device; and shape inputting means for inputting dimensional values to the data input areas of said nominal dimension list by the indication of a shape element using said input device.

12. A machining program processor comprising:

drawing processor means comprising (1) a parametric diagram generating means for generating a parametric diagram comprising at least one variable parameter, (2) a nominal dimension list generating means for generating a nominal dimension list having data input areas wherein data related to a plurality of shapes based on said parametric diagram and data related to said at least one variable parameter in said parametric diagram generated by said parametric diagram generating means can be input to said data input areas, (3) a condition input means for inputting machining conditions to said list, and (4) means for storing said generated list and diagram;

shape analyzer means for generating shape data from data in said stored list; and NC data generator means for generating NC data in response to said shape data and said machining condition data.

13. The machining program processor as set forth in claim 12, further comprising:

machining condition adding means for adding machining conditions to a machining shape generated according to the input data input to the nominal dimension list corresponding to the parametric diagram generated by said drawing processor, said machining conditions being added in relation to the input data input to the nominal dimension list.

14. The machining program processor as set forth in claim 13, further comprising:

shape indicating means for inputting specific numerical values to said numerical list.

15. A machining program processing method comprising the steps of:

(a) plotting a parametric diagram;

(b) plotting a nominal dimension list having data input areas into which data related to a plurality of shapes based on said parametric diagram can be input;

(c) inputting data to said input areas;

(d) selecting data corresponding to said parametric diagram; and (e) adding machining conditions to a machining shape generated according to the data related to the parametric diagram and input to the data input areas of said nominal dimension list, said machining conditions being added in relation to the input data input to the nominal dimension list.

16. The drawing processor method as set forth in claim 15, further comprising:

displaying said nominal dimension list along with said parametric diagram in order to facilitate said selecting step.

17. The drawing processor method as set forth in claim 16, further comprising:

displaying said nominal dimension list in order to facilitate said input step; and interactively inputting data on the basis of said display step.

18. The drawing processor method as set forth in claim 15, further comprising:

storing said input data as named sets and accessing said sets using names of said named sets.

19. The drawing processor method as set forth in claim 18, further comprising at least one of displaying and editing said named set data.

20. The method of generating a NC program comprising:

generating at least one nominal dimension list, said list comprising at least a nominal dimension name and corresponding data defining variables for at least one parametric diagram;

storing said at least one nominal dimension list;

accessing said corresponding data from said stored at least one list using one said nominal dimension name;

selecting a shape by machining condition command; and generating a NC program on the basis of said corresponding data and said selected shape.

21. The method of generating a NC program as set forth in claim 20, further comprising storing a plurality of nominal dimension lists, selecting one of said stored lists and accessing said corresponding data from said selected list.

22. The method of generating a NC program as set forth in claim 21, further comprising displaying said list and said parametric diagram for interactive selection of said shape.

23. The method of selectively forming drawings with variable dimensional values comprising:

generating a plurality of parametric diagrams, said diagrams having variable dimensions and being representative of a plurality of shapes;

generating sets of data for the dimension variables for said parametric diagrams, each set corresponding to one of said plurality of shapes;

registering said generated diagrams and said data sets on the basis of nominal dimension names;

generating a shape on the basis of said nominal dimension name and said registered diagrams and variable data from storage; and displaying said shape.

24. The method of selectively forming drawings as set forth in claim 23, further comprising:

storing said generated sets of data as at least one nominal dimension list;

selecting a generated set from said list; and editing said selected set data.

25. The method of selectively forming drawings as set forth in claim 23, further comprising:

selecting a shape on the basis of said nominal dimension name;

generating at least one of a stereoscopic drawing and projection drawing and adding machining conditions on the basis of data in a set represented by said nominal dimension name; and adding machining conditions to said selected shape.

* * * * *